US011926099B2

(12) United States Patent
Stulc et al.

(10) Patent No.: US 11,926,099 B2
(45) Date of Patent: Mar. 12, 2024

(54) ADDITIVE MANUFACTURING SYSTEM

(71) Applicant: Continuous Composites Inc., Coeur d'Alene, ID (US)

(72) Inventors: Andrew Michael Stulc, Spokane, WA (US); Nathan Andrew Stranberg, Post Falls, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

(21) Appl. No.: 17/651,748

(22) Filed: Feb. 18, 2022

(65) Prior Publication Data

US 2022/0339868 A1 Oct. 27, 2022

Related U.S. Application Data

(60) Provisional application No. 63/180,633, filed on Apr. 27, 2021.

(51) Int. Cl.

| | |
|---|---|
| *B29C 64/118* | (2017.01) |
| *B29C 64/165* | (2017.01) |
| *B29C 64/209* | (2017.01) |
| *B29C 64/241* | (2017.01) |
| *B29C 64/245* | (2017.01) |
| *B29C 64/295* | (2017.01) |
| *B29C 64/336* | (2017.01) |
| *B29C 64/357* | (2017.01) |
| *B29C 64/379* | (2017.01) |
| *B29C 64/393* | (2017.01) |
| *B33Y 10/00* | (2015.01) |
| *B33Y 30/00* | (2015.01) |

(Continued)

(52) U.S. Cl.
CPC .......... *B29C 64/336* (2017.08); *B29C 64/118* (2017.08); *B29C 64/165* (2017.08); *B29C 64/209* (2017.08); *B29C 64/241* (2017.08); *B29C 64/245* (2017.08); *B29C 64/295* (2017.08); *B29C 64/357* (2017.08); *B29C 64/379* (2017.08); *B29C 64/393* (2017.08); *B33Y 10/00* (2014.12); *B33Y 30/00* (2014.12); *B29C 64/227* (2017.08); *B33Y 40/10* (2020.01); *B33Y 70/10* (2020.01)

(58) Field of Classification Search
CPC ... B29C 64/336; B29C 64/379; B29C 64/118; B29C 64/245; B29C 64/295; B29C 64/209; B29C 64/393; B29C 64/241; B29C 64/165

See application file for complete search history.

(56) References Cited

U.S. PATENT DOCUMENTS

2018/0207857 A1* 7/2018 Budge .................... B33Y 10/00

FOREIGN PATENT DOCUMENTS

WO WO-2019075572 A1 * 4/2019 ............ A61B 34/30

OTHER PUBLICATIONS

Moog Motion Technology Catalog, 2020 (Year: 2020).*

(Continued)

*Primary Examiner* — Alison L Hindenlang
*Assistant Examiner* — Erica Hartsell Funk
(74) *Attorney, Agent, or Firm* — Ryan Stockett

(57) ABSTRACT

A system is disclosed for additively manufacturing a structure. The system may include a motion platform, a print head, and a drive. The drive may include a base connectable to the motion platform, a slipring disposed inside of the base, and a drivetrain extending between the base and the print head.

3 Claims, 6 Drawing Sheets

(51) Int. Cl.
  *B29C 64/227*    (2017.01)
  *B33Y 40/10*     (2020.01)
  *B33Y 70/10*     (2020.01)

(56) References Cited

OTHER PUBLICATIONS

TerraVestra design on Thingiverse (Year: 2021).*
H. Peng, "A 3D Printer for Interactive Electromagnetic Devices", 2016 (Year: 2016).*
Hi-Force https://www.hi-force.com/en-uk/blog-details/3/using-hydraulic-fluid-pressure-to-generate-a-force and wayback machine reference (Year: 2016).*
Yin, Machinery, Materials Science and Engineering Applications, mechanical engineering (Year: 2017).*
How to install an igus triflex RSE cable management system on a six-axis robot, IGUS, Inc https://youtu.be/hcY5Szix6TI (Year: 2018).*
Gardner, Electroimpact's 6-axis continuous fiber 3D printer, one part of future multi-functional manufacturing cell (CompositesWorld Jul. 7, 2020), https://www.compositesworld.com/news/electroimpacts-6-axis-continuous-fiber-3d-printer-one-part-of-future-multi-functional-manufacturing-cell.
Electroimpact Automation, Electroimpact Continuous Fiber 3D Printing, Youtube (May 22, 2020), https://www.youtube.com/watch?v=_desic68RMw&t=1s.

* cited by examiner

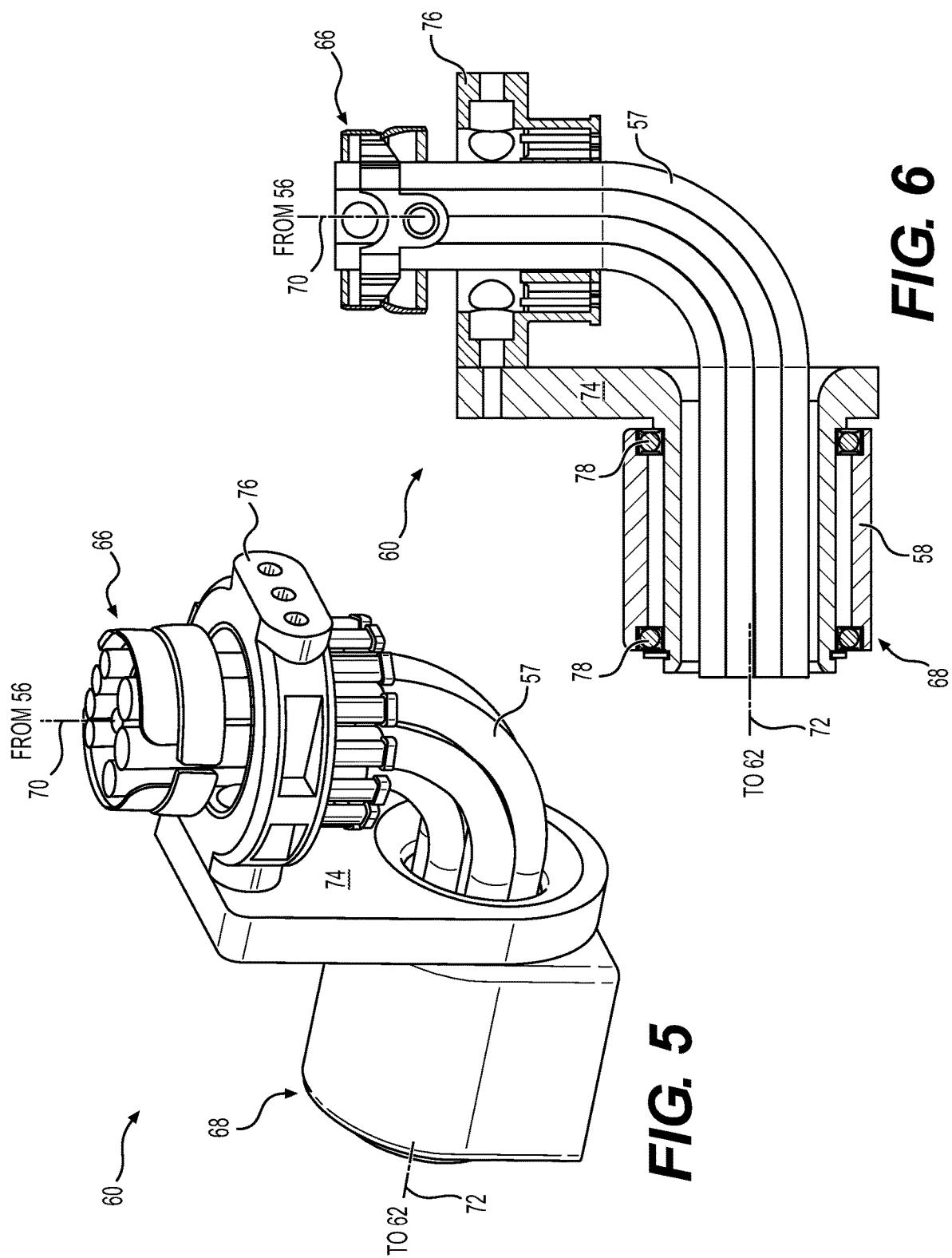

ADDITIVE MANUFACTURING SYSTEM

RELATED APPLICATION

This application is based on and claims the benefit of priority from United States Provisional Application No. 63/180,633 that was filed on Apr. 27, 2021, the contents of which are expressly incorporated herein by reference.

TECHNICAL FIELD

The present disclosure relates generally to a manufacturing system and, more particularly, to a system for additively manufacturing a structure.

BACKGROUND

Continuous fiber 3D printing (a.k.a., CF3D®) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a liquid thermoset (e.g., an energy-curable single- or multi-part resin), or a combination of any of these and other known matrixes. Upon exiting the print head, a cure enhancer (e.g., a UV light, a laser, an ultrasonic emitter, a heat source, a catalyst supply, or another energy source.) is activated to initiate, enhance, and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to TYLER on Dec. 6, 2016 and incorporated herein by reference.

A print head capable of CF3D® may be mounted to a support that moves the print head during material discharge for fabrication of three-dimensional structures. As disclosed in U.S. patent application Ser. No. 17/443,421 that was filed on Jul. 26, 2021 ("the '421 application") and incorporated herein by reference, exemplary supports can include robotic arms, gantries, and/or hybrid gantry-arms. In these embodiments, power (e.g., electrical, hydraulic, pneumatic, mechanical, etc.), control signals, and/or material (e.g., reinforcements and/or matrix) may be supplied to the print head via the support.

While the system of the '421 application may be functionally adequate for many applications, it may be less than optimal. For example, rotation of the print head during material discharge may be limited. That is, any conduits associated with supply of power, control signals, and/or material may twist during rotation of the head and eventually reach a physical limit associated with the conduits. When this limit is reached, discharge is interrupted and the print head counterrotated so the conduits can untwist and be reset for further use. This interruption is inefficient and can cause discontinuities in the structure being fabricated. The disclosed system is directed at addressing one or more of these issues and/or other problems of the prior art.

SUMMARY

In one aspect, the present disclosure is directed to an additive manufacturing system. The additive manufacturing system may include motion platform, a print head, and a drive. The drive may include a drive base connectable to the motion platform, a slipring disposed inside of the drive base, and a drivetrain extending between the drive base and the print head.

In another aspect, the present disclosure is directed to another additive manufacturing system. This additive manufacturing system may include a motion platform, a print head, and at least one conduit extending from the motion platform to the print head. The additive manufacturing system may also include a management unit configured to exert a force on the at least one conduit to urge the at least one conduit away from a straight-line path from the motion platform to the print head, and a coupling pivotally connecting the at least one conduit to the print head.

In yet another aspect, the present disclosure is directed to a method of additively manufacturing a structure. The method may include discharging a material from a print head, and moving the print head with a motion platform during discharging to form the structure with the material. The method may also include supplying electrical power and a pressurized medium to the print head via a slipring disposed between the motion platform and the print head

BRIEF DESCRIPTION OF THE DRAWINGS

FIG. 5 is a diagrammatic illustration of another portion of the additive manufacturing system of FIG. 1;

FIG. 6 is a cross-sectional view of this other portion of the additive manufacturing system of FIG. 5;

DETAILED DESCRIPTION

The term "about" as used herein serves to reasonably encompass or describe minor variations in numerical values measured by instrumental analysis or as a result of sample handling. Such minor variations may be considered to be "within engineering tolerances" and in the order of plus or minus 0% to 10%, plus or minus 0% to 5%, or plus or minus 0% to 1%, of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
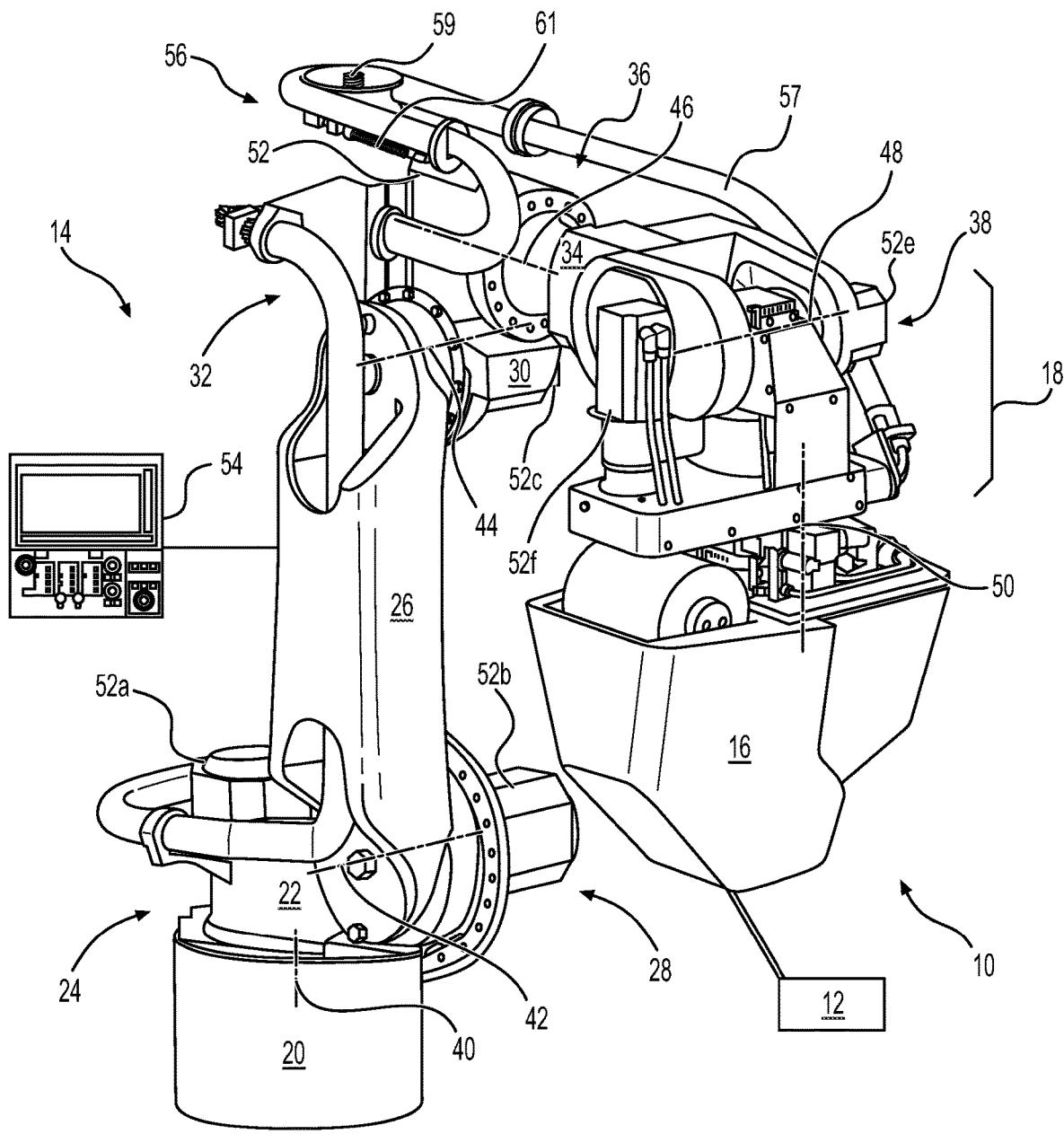
FIG. 1 is a diagrammatic illustration of an exemplary disclosed additive manufacturing system.

FIG. 1 illustrates an exemplary system 10, which may be used to manufacture a structure 12 having any desired shape. System 10 may include a support 14, a deposition head ("head") 16, and a drive 18 operatively connecting head 16 to support 14. Head 16 may be coupled to and moved by support 14. In the depicted embodiment, head 16 is a CF3D® head configured to discharge a composite material, including a continuous reinforcement and a liquid matrix coating the continuous reinforcement. It is contemplated, however, that other types of depositions heads (FDM, FFF, ATP, AFP, etc.) may alternatively be connected to support 14 and configured to deposit a single material or a composite material including a matrix and a continuous reinforcement, chopped reinforcement, and/or reinforcement particles, as desired.

For the purposes of this disclosure, support 14 will be described as a robotic arm capable of moving head 16 along and/or about multiple axes (e.g., 2 axes, 3 axes, 4 axes, 5 axes, 6 axes or more). It is contemplated, however that another type of support 14 could alternative be connected to move head 16 via drive 18, if desired. For example, support 14 could embody a gantry type of motion platform or a gantry-arm hybrid.

As a robotic arm, support 14 may include a support base 20 and any number of links operatively connected to support base 20. Support base 20 may be stationary (shown as a fixed pedestal in FIG. 1) or moveable (e.g., mounted to a crawling undercarriage, a sliding rail, and/or a gantry system—not shown). The links of support 14 may include a first link 22 connected to support base 20 at a waist joint 24, a second link 26 connected to first link 22 at a shoulder joint 28, a third link 30 connected to second link 26 at an elbow joint 32, and a fourth link 34 connected to third link 30 at a wrist joint 36. Drive 18 may be connected to fourth link 34 at a joint 38. Head 16, as will be explained in more detail below, may be connected to drive 18 at an end opposite joint 38.

Link 22 may be configured to rotate about a first (e.g., a vertical) axis 40 of waist joint 24. Link 26 may be configured to rotate about a second (e.g., a horizontal) axis 42 of shoulder joint 28 that is generally orthogonal to first axis 40. Link 30 may be configured to rotate about a third (e.g., a horizontal) axis 44 of elbow joint 32 that is generally parallel with second axis 42. Link 34 may be configured to rotate about a fourth (e.g., a horizontal or vertical) axis 46 of wrist joint 36 that is generally perpendicular to axis 44. Drive 18 may be configured to rotate about a fifth (e.g., a horizontal or vertical) axis 48 of joint 38 that is generally perpendicular to axis 46. As will be explained in more detail below, drive 18 may rotate head 16 about an additional axis 50 that is generally perpendicular to axis 48.

One or more motors 52 may be situated to selectively effect each of the above-described rotations in response to commands generated by a controller 54. For example, at least one motor 52*a*-52*e* may be associated with each of joints 24, 28, 32, 36, and 48, respectively; rigidly mounted to one member of the associated joint; and operatively mounted to the other member of the joint. An additional motor 52*f* may be associated with drive 18.

Drive 18 may be an assembly of components that cooperate to supply power, signals, pressurized medium(s), and/or other needs of system 10 to head 16, and to drive rotation of head 16 without compromising the supplies. These needs may be provided to drive 18 via a conduit management unit ("unit") 56. Unit 56 may be configured to guide cables, power lines, signal lines, pressurized hoses, and/or other conduits 57 placed therein from support 14 to drive 18, while inhibiting looping, kinks, or other problems associated with conduits 57 in the work area of system 10. Unit 56 may do this by forcing conduits 57 to pass around a redirect 59, and biasing redirect 59 away from a straight-line trajectory between drive 18 and an anchoring portion of support 14 (e.g., joint 36). In this way, unit 56 may exert a retracting force on conduits 57 that keeps conduits 57 taut, regardless of the movements of drive 18 (and/or head 16). For example, in situations where drive 18 and/or head 16 moves toward support 14 and conduits 57 would otherwise droop because of slack therein (e.g., because of a shorter distance therebetween and an excess length of conduits 57), unit 56 may bias (e.g., via a spring 61) conduits 57 further away from the straight-line trajectory to absorb the excess length and otherwise resulting slack. In contrast, in situations where drive 18 and/or head 16 moves away from support 14 and conduits 57 would otherwise be stretched because of the increasing distance, redirect 59 of unit 56 may be pulled by the motion back into alignment with the straight-line trajectory, thereby increasing an effective length of conduits 57 and reducing the tensile force acting on conduits 57.

Figures 2, 3:
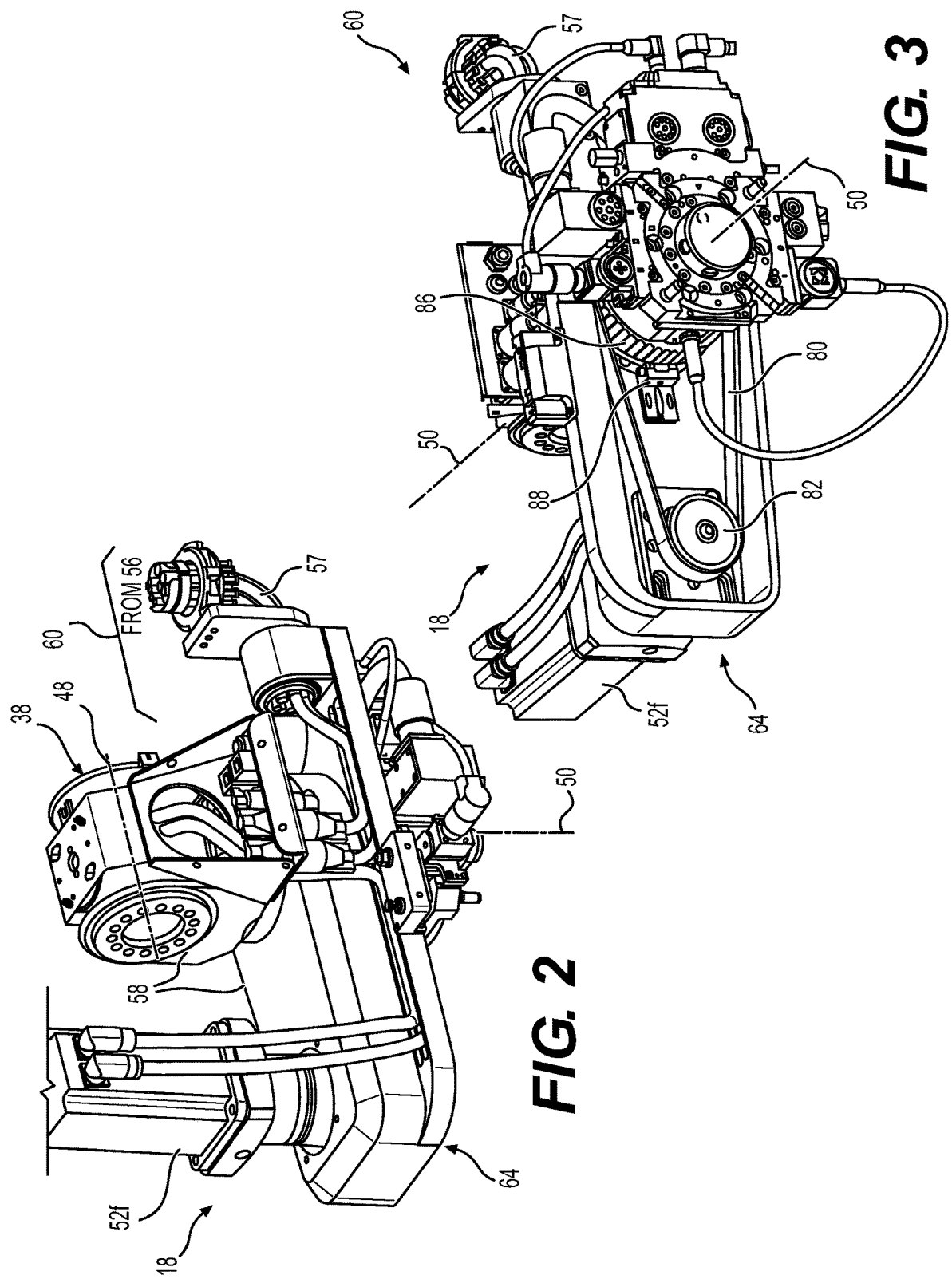
FIGS. 2 and 3 are diagrammatic illustrations of a portion of the additive manufacturing system of FIG. 1.
Figure 4:
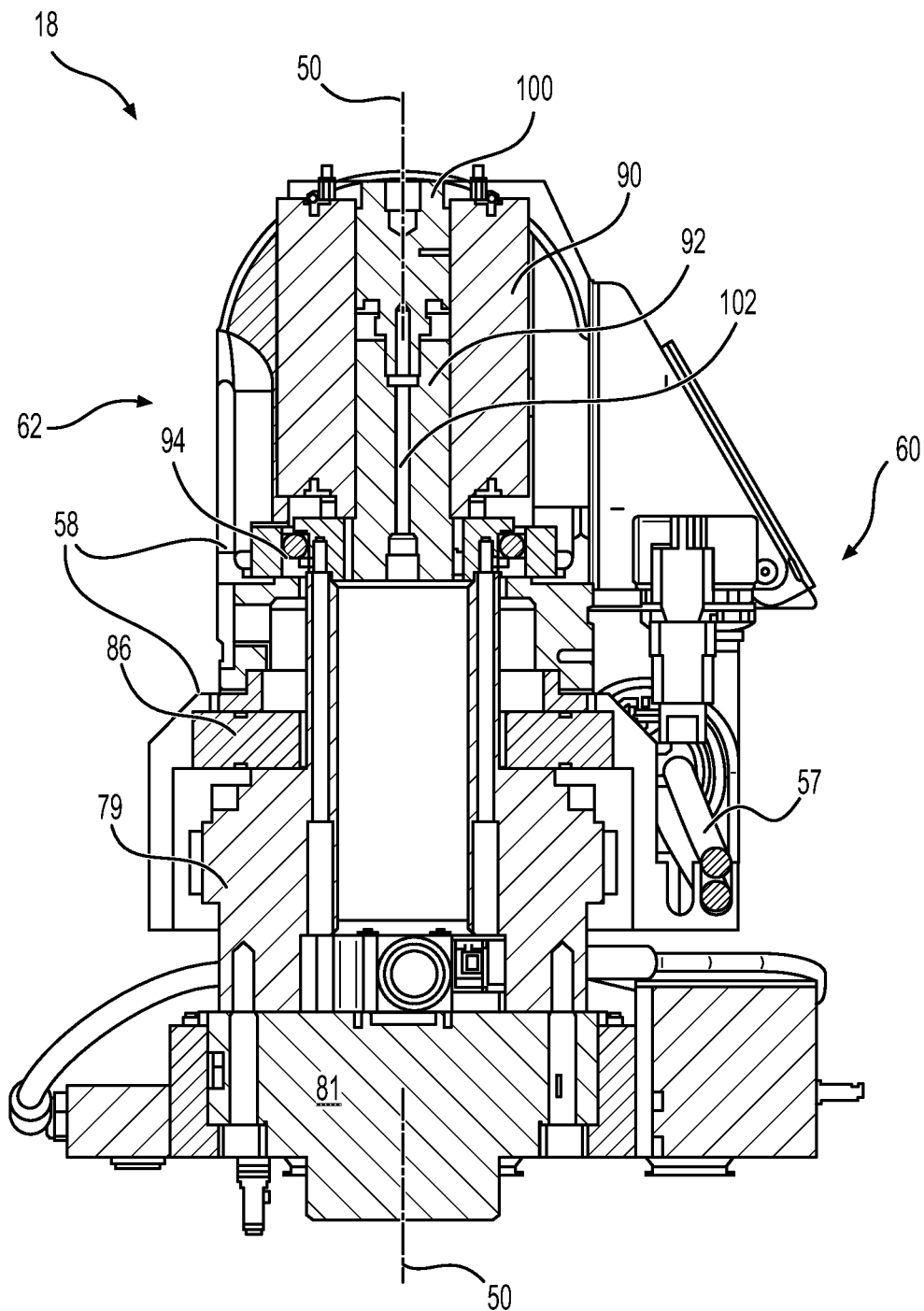
FIG. 4 is a cross-sectional view of the portion of the additive manufacturing system illustrated in FIGS. 2 and 3.

As shown in FIGS. 2-4, the components of drive 18 may include, among other things, a drive base 58 that forms a portion of joint 38 (e.g., a portion that pivotally connects between ears of link 34—referring to FIG. 1) and supports motor 52*f*, a conduit coupling ("coupling") 60 operatively connected between unit 56 and drive base 58 (referring to FIG. 1), a slipring 62 disposed inside of drive base 58 and connected between coupling 60 and head 16 (omitted from FIGS. 2-4 for clarity), and a drivetrain 64 that extends from motor 52*f* to head 16. Coupling 60 may be located at a side (e.g., a horizontal side relative to the perspective of FIG. 2) of axis 50 opposite motor 52*f*. Head 16 and drivetrain 64 may be located at a side (e.g., a vertical side) of drive base 58 opposite motor 52*f*. For example, a portion of motor 52*f* may extend through drive base 58 to drivetrain 64. An axis of slipring 62 may extend generally parallel to an axis of motor 52*f* and be centered between the ears of link 34 (e.g., in alignment with axis 50—referring to FIG. 1). As will be disclosed in more detail below, motor 52*f* may be selectively actuated by controller 54 to cause rotations of head 16 about axis 50 via drivetrain 64. At this same time, the needs of head 16 may be supplied from unit 56 through coupling 60 and slipring 62 to head 16.

An exemplary coupling 60 is illustrated in FIGS. 5 and 6. As shown in these figures, coupling 60 may include an inlet end 66 that receives supplies from unit 56, and an outlet end 68 that discharges supplies to slipring 62. An axis 70 of inlet end 66 may be oriented generally perpendicular to an axis 72 of outlet end 68, and axis 72 may be oriented generally perpendicular to an axis of motor 52*f*. Conduits 57 that pass through inlet end 66 may be secured to a housing 74 via a clamp 76. Clamp 76 may be pivotally connected to drive base 58 (referring to FIG. 2) via one or more bearings 78. In this manner, drive base 58 may be capable of pivoting about axis 72 (and/or housing 74 and clamp 76 may be able to pivot about axis 72 relative to drive base 58) without causing undesired twisting or kinking of conduits 57. The pivoting of drive base 58 may also allow for a full range of motion of support 14 around axes 46 and 48 (referring to FIG. 1) with less linear travel required of unit 56.

Figure 7:
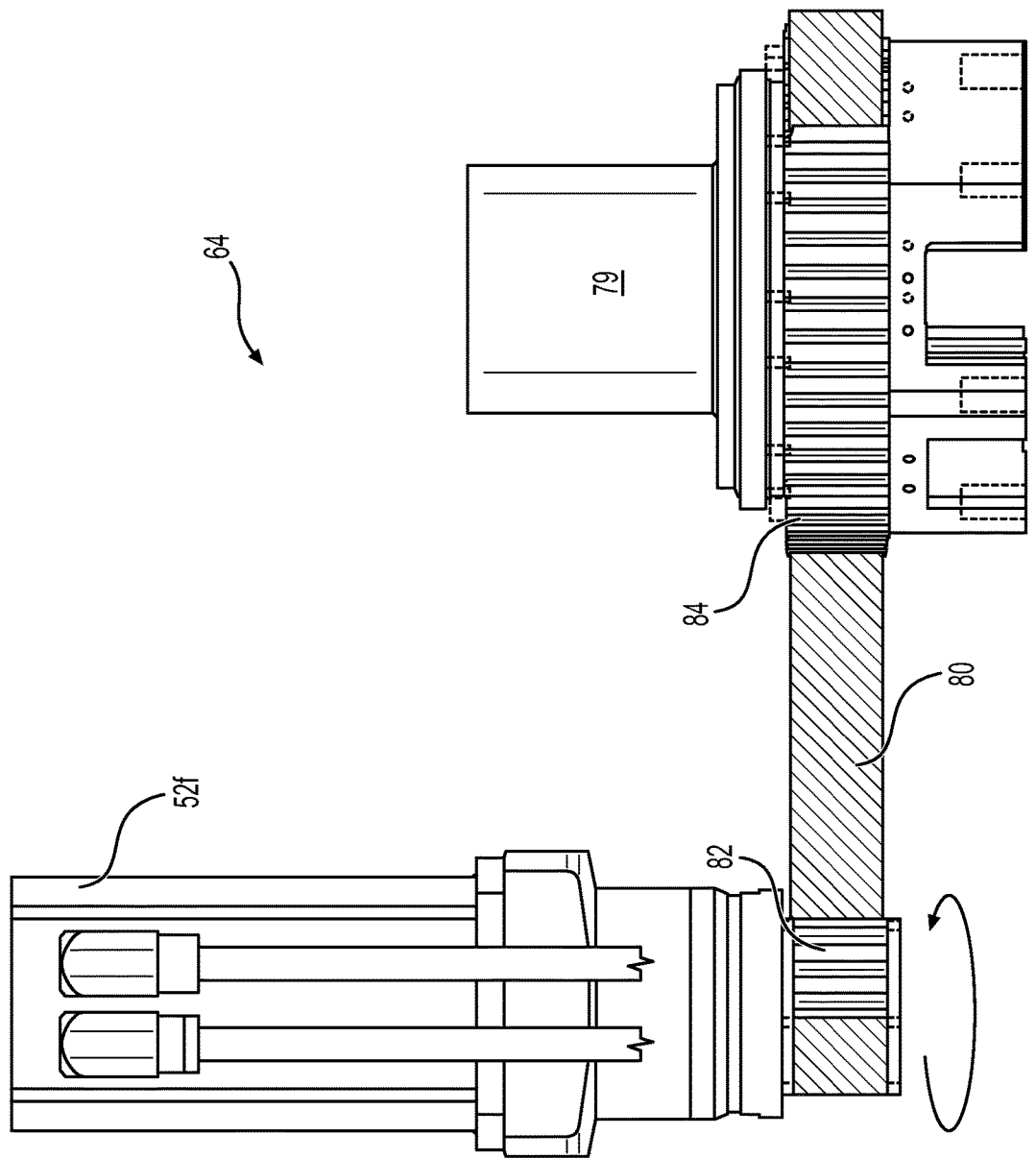
FIG. 7 is a cross-sectional view of yet another portion of the additive manufacturing system of FIG. 1.

An exemplary drivetrain 64 is illustrated in FIG. 7. As shown in this figure, drivetrain 64 may include motor 52*f*, an output member 79, and a torque transmitter 80 extending between motor 52*f* and member 79. In the disclosed embodiment, transmitter 80 is a belt that extends between an output (e.g., a cogwheel, a pulley, a gear, a speed reducer, etc.) 82 of motor 52*f* and an input (e.g., a cogwheel, a pully, a gear, etc.) 84 of member 79. It is contemplated, however, that another type of transmitter (e.g., a gear, a gear box, a shaft, etc.) 80 could alternatively or additionally be utilized to transfer torque, if desired. Member 79 may either fasten directly to head 16 or removably couple (e.g., via one or more manual or automated latching mechanisms 81) to another member (e.g., a mirrored version of member 79—not shown) that is fastened directly to head 16. Member 79 may have a center bore and/or one or more peripheral bores that allow passage of supply conduits 57 therethrough. In the disclosed embodiment, member 79 is pivotally mounted to drive base 58 via one or more bearings (e.g., cross-bearings—shown only in FIG. 4) 86.

One or more sensors (e.g., rotary encoders) may be associated with the rotating components of drive 18. For example, a primary encoder (not shown—mounted inside motor 52*f*) may be configured to generate signals indicative of one or more rotation parameters (e.g., angle, speed, acceleration, etc.) of motor 52*f*. Similarly, a secondary encoder 88 (shown only in FIG. 3) may be configured to generate signals indicative of one or more rotation parameters of member 86. Signals from these sensors (as well as power directed to motor 52*f*) may bypass slipring 62 and coupling 44. However, a majority (e.g., a remainder) of the supplies being directed to head 16 may generally pass through slipring 62 and coupling 44.

Figure 8:
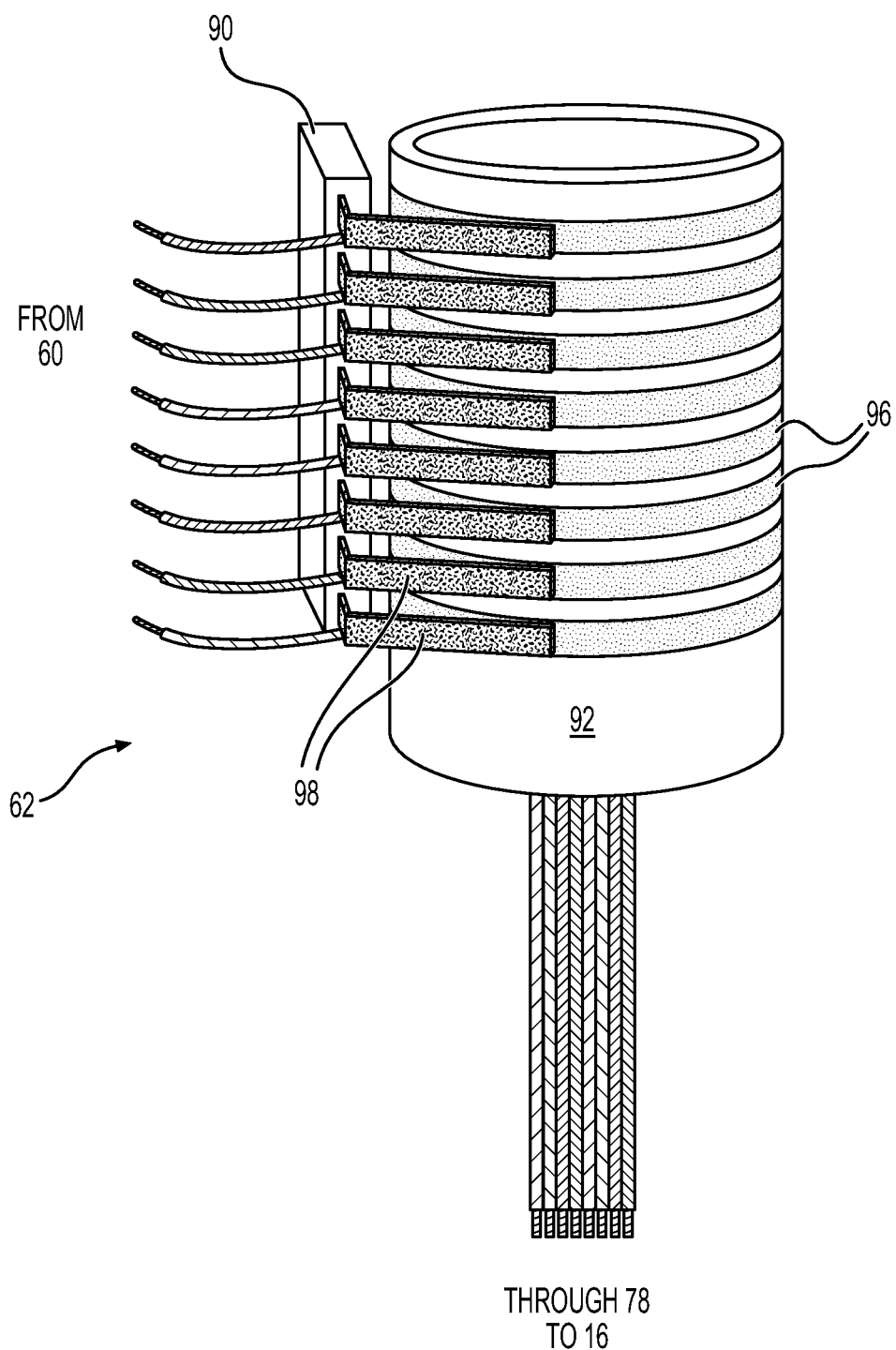
FIG. 8 is a diagrammatic illustration of the portion of the additive manufacturing system shown in FIG. 7.

FIG. 8 illustrates an exemplary slipring 62. As shown in this figure, slipring 62 may include, among other things, a stator 90 that is fixedly mounted to drive base 58 (referring to FIG. 4), and a rotor 92 that is rotationally mounted inside of stator 90 via one or more bearings 94. Stator 90 may be configured to separately receive each of conduits 57 passing through coupling 60. Rotor 92 may include as many conducting channels or bands 96 as conduits received by stator 90. At least one transmitter 98 may extend through an annular gap between stator 90 and rotor 92 at each channel or band 96 and function to transmit the supply associated therewith.

In some applications, slipring 62 (e.g., conduits 57) may pass only electrical signals. In these applications, other means may be employed to pass supplies (e.g., pressurized media) to head 16. For example, a rotary union 100 may be used. In the embodiment of FIG. 8, union 100 may be located centrally within slipring 62 (e.g., coaxially with rotor 92 inside of stator 90). In this arrangement, union 100 may pass a pressurized medium through rotor 92 via a central passage 102.

INDUSTRIAL APPLICABILITY

The disclosed system may be used to additively manufacture structures with a print head that receives one or more supplies (e.g., power, compressed medium(s), control signal(s), consumable material(s), etc.) via a motion platform (e.g., a robotic arm, a gantry, an arm-gantry hybrid, etc.). The disclosed system may allow these supplies to be passed from the motion platform to the print head, while reducing looping, kinking, twisting or other issues associated with conduits that transmit the supplies. Operation of system 10 will now be described in detail with reference to FIGS. 1-8.

At a start of a manufacturing event, information regarding a desired structure 12 may be loaded into system 10 (e.g., into controller 54 that is responsible for regulating operations of support 14 and/or head 16). This information may include, among other things, a size (e.g., diameter, wall thickness, length, etc.), a shape, a contour (e.g., a trajectory), surface features (e.g., ridge size, location, thickness, length; flange size, location, thickness, length; etc.) and finishes, connection geometry (e.g., locations and sizes of couplers, tees, splices, etc.), location-specific matrix stipulations, location-specific reinforcement stipulations, compaction requirements, curing requirements, etc. It should be noted that this information may alternatively or additionally be loaded into system 10 at different times and/or continuously during the manufacturing event, if desired.

Based on the component information, one or more different materials and/or other supply needs may be selectively loaded into support 14 and/or head 16 prior to operation of system 10, and/or selectively passed from support 14 (or an offboard source) to head 16 during operation. For example, power (e.g., electrical power used to energize heaters, cure devices, cutting mechanism, compactors, sensors, and other devices), compressed medium(s) (e.g., air used to actuate latching mechanism 81), control signals (e.g., to/from controller 54 and/or sensor(s) of system 10), matrix, reinforcement, etc. may be directed from an onboard and/or offboard source through conduit(s) 57 and drive 18 to head 16. The supplies may pass through conduits 57 and coupling 60, to stator 90. From stator 90, the supplies may pass through one or more separate transmitter(s) 98 to channels or bands 96 in rotor 92. The supplies may then continue to the respective component(s) within head 16 (e.g., to motors, actuators, pumps, nozzles, couplers, sensors, etc.) via corresponding conduits, passages, wires, etc. It should be noted that one or more supplies (e.g., control signals, excess material, etc.) could also or alternatively be passed in reverse direction from head 16 back through slipring 62 to support 14 or an offboard component or system, if desired.

The component information may be used to control operation of system 10. For example, material may be discharged from head 16, while support 14 selectively moves head 16 in a desired manner. This discharge may result in discharged paths of material following a desired trajectory (e.g., a free-space, unsupported, 3-D trajectory) required to produce structure 12.

During operation of head 16 (e.g., during material discharge and/or movement), slipring 62 and/or unit 56 may function to prolong the useful life of conduits 57, while simultaneously improving supply continuity. For example, slipring 62 may allow for infinite rotations of head 16, without causing twisting of conduits 57 and without having to periodically interrupt fabrication of structure 12 to untwist conduits 57. In another example, unit 56 may allow for translation and/or tilting of head 16 relative to support 14 by either increasing or decreasing the effective length of conduits 57. This may reduce looping, kinking and/or stretching of conduits 57.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. An additive manufacturing system, comprising:
a support including a support base and at least one link extending from the support base, wherein the support is one of a robotic arm, a gantry, or an arm-gantry hybrid;
a print head;
a drive, including:
a drive base, wherein the drive base forms a portion of a joint connectable to the at least one link;
a slipring disposed inside of the drive base;
a drivetrain extending between the drive base and the print head, and
a rotary union disposed inside of the slipring and configured to pass a pressurized medium to the print head; and
a latching mechanism configured to connect the print head to the drivetrain using the pressurized medium.

2. An additive manufacturing system, comprising:
- a support including a support base and at least one link extending from the support base, wherein the support is one of a robotic arm, a gantry, or an arm-gantry hybrid;
- a print head;
- a drive;
- at least one conduit having a length extending from the support, through the drive and to the print head;
- a conduit management unit configured to exert a force on the at least one conduit to keep the length of at least one conduit taut regardless of translation of the printhead relative to the support and/or tilting of the printhead relative to the support; and
- a coupling pivotally connecting the at least one conduit to the print head, wherein the coupling pivotally connects the at least one conduit to the print head via the drive;
- the drive includes a first axis about which the print head is rotated; and
- the coupling includes a pivot axis, wherein the pivot axis is perpendicular to the first axis of the drive.

3. The additive manufacturing system of claim 2, wherein the pivot axis of the coupling is parallel with a final axis of the support at the drive.

* * * * *